UNITED STATES PATENT OFFICE.

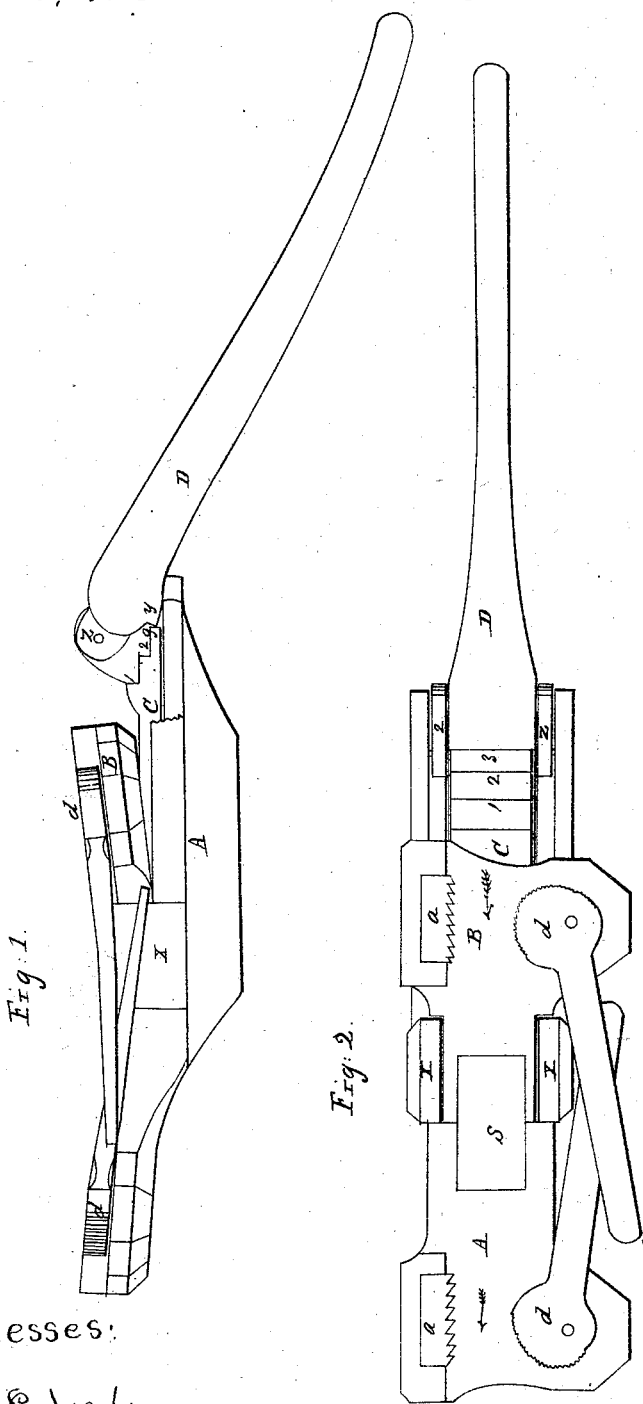

LEVI W. LOOMIS, OF HOMER, NEW YORK.

IMPROVED APPARATUS FOR UPSETTING TIRES.

Specification forming part of Letters Patent No. 58,111, dated September 18, 1866.

*To all whom it may concern:*

Be it known that I, LEVI W. LOOMIS, of Homer, in the county of Cortland and State of New York, have invented certain new and useful Improvements in Tire-Upsetting Machines; and I do hereby declare that the following is a full, clear, and exact description of the same, reference being had to the accompanying drawings and the letters of reference marked thereon, making a part of this specification.

In the annexed drawings, A represents the body of this machine, which is generally made of iron, and with a strip on its under side to allow it to be held in a vise or in the required position. Resting upon the piece A is a sliding plate, B, which is held to the body A by the guides $x\,x$. D represents a lever, which is attached at one end of the body A to small arms $z\,z$, which arms are pivoted to ears in the end of the machine. C represents a metallic strip at the under portion of the plate B, and slides in a groove made in the body A, extending beyond the end of the plate B, and having notches 1 2 3 at its extreme end. This plate B and strip C are forced forward to the opposite end of the groove in the machine by a shoulder, $y$, cut in the lower portion of the lever D, by said shoulder pressing against the notches 1, 2, and 3, as heretofore described.

$d\,d$ represents two cams, one on body A and the other on the plate B, which are placed near the outer edge of the machine, and are provided with cogs to more effectually grasp the tire.

$a\,a$ represent two stationary ratchets, which are placed opposite the cams $d\,d$, so that when the tire is placed upon the machine it is held perfectly secure between the cam and ratchets.

At the center of the machine is cut an oblong opening, $s$, to make the shape of the device more in conformity to the shape of the tire.

In the operation of upsetting a tire by this invention, the tire is heated, and the plate B is drawn as far as it will go toward the lever D, when the tire is placed upon the machine between the cams and ratchets. The lever is then brought to force the plates together, and the work thereby accomplished.

Having thus fully described my invention, what I claim as new, and desire to secure by Letters Patent, is—

The movable plate B, provided with the notched strip C, and operated by a shoulder of the lever D and arms $z\,z$ to force said plate against the body A to upset the tire when held between cams and ratchets, substantially as herein set forth.

As evidence that I claim the foregoing I have hereunto set my hand.

LEVI W. LOOMIS.

Witnesses:
WM. ANDREWS,
HENRY HAM.